Jan. 16, 1923.
H. R. YOUNG.
BORING AND MILLING MACHINE.
FILED JAN. 24, 1920.
1,442,210.
14 SHEETS—SHEET 4.
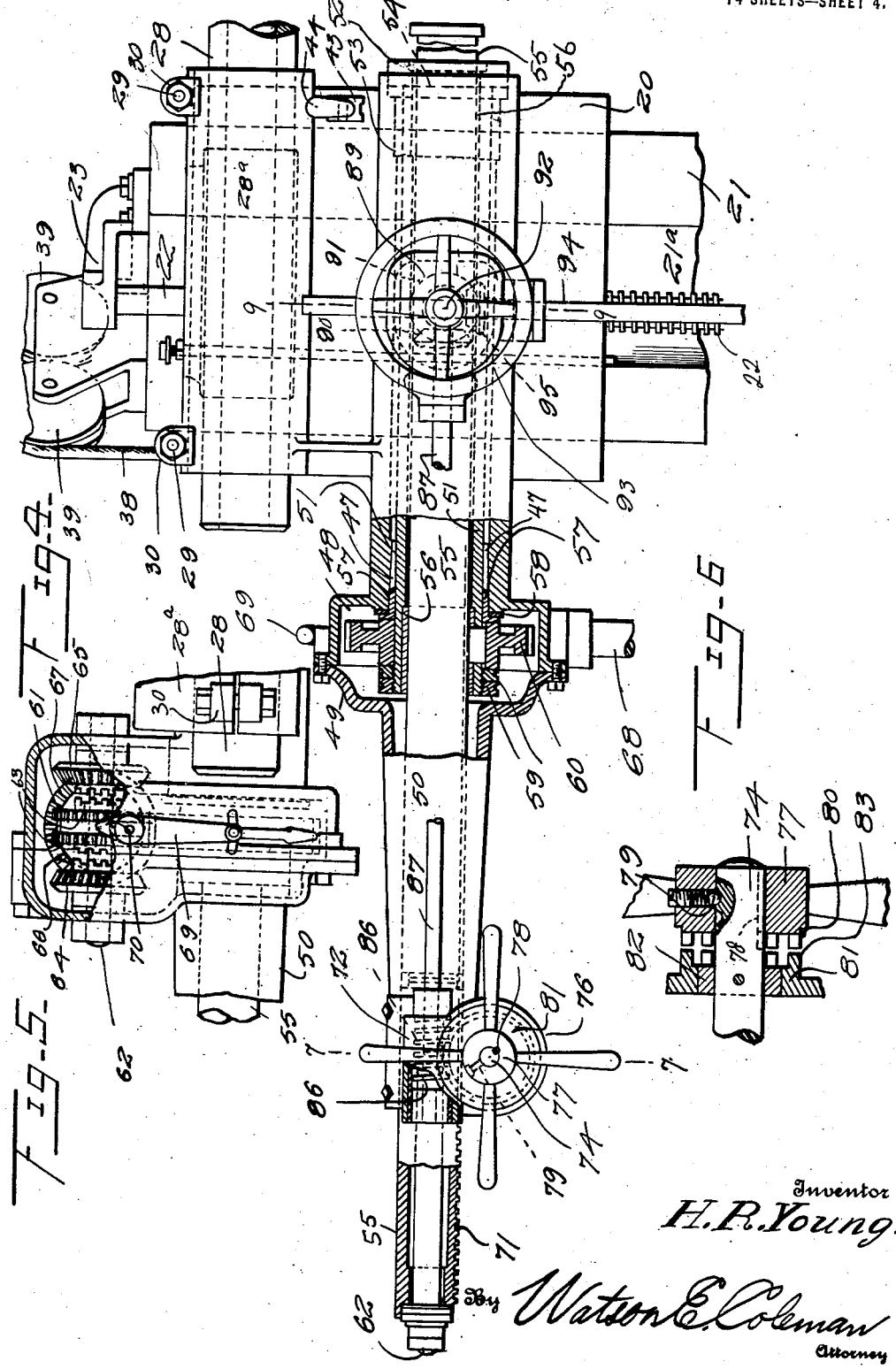
Inventor
H. R. Young.
By Watson E. Coleman
Attorney

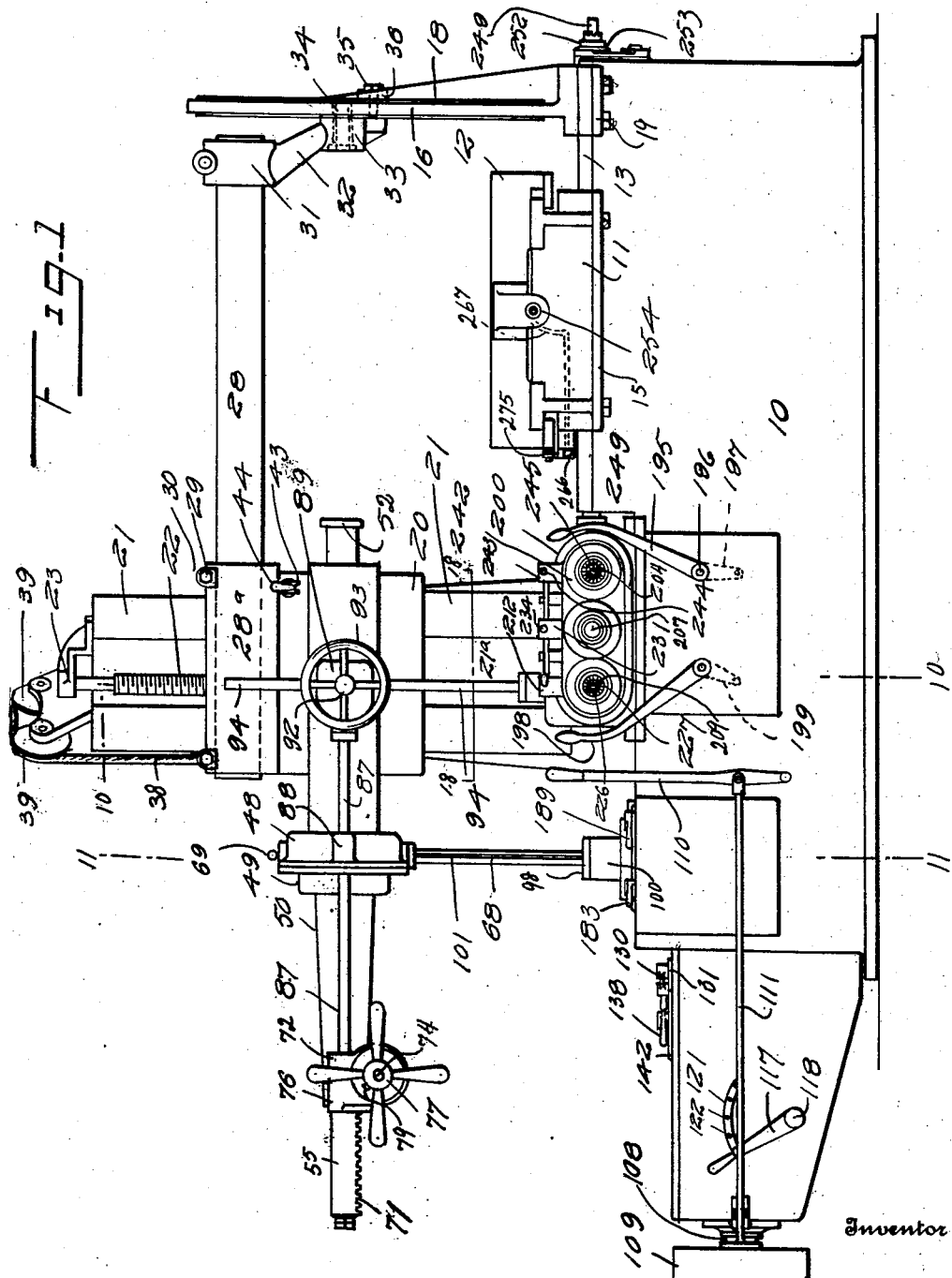

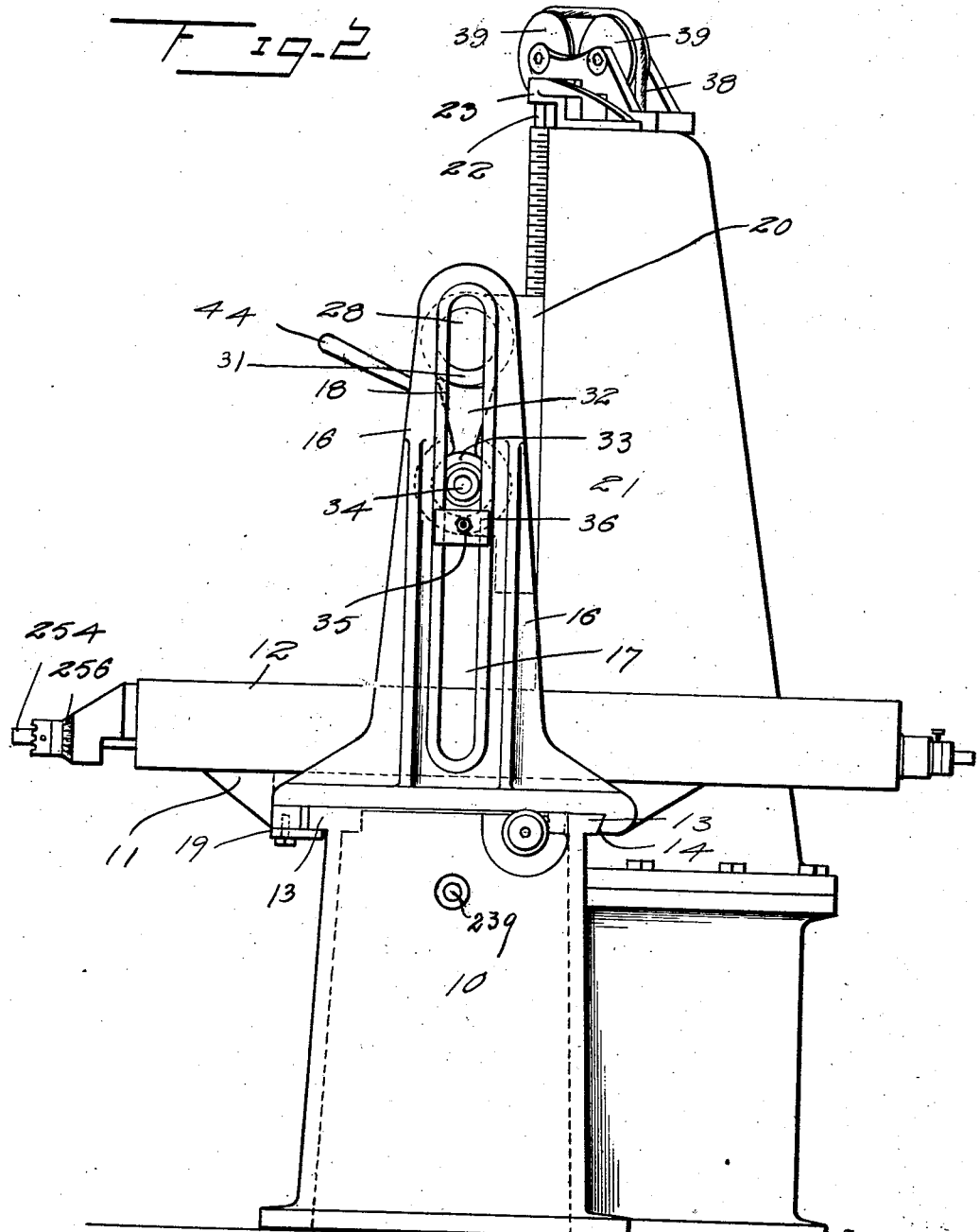

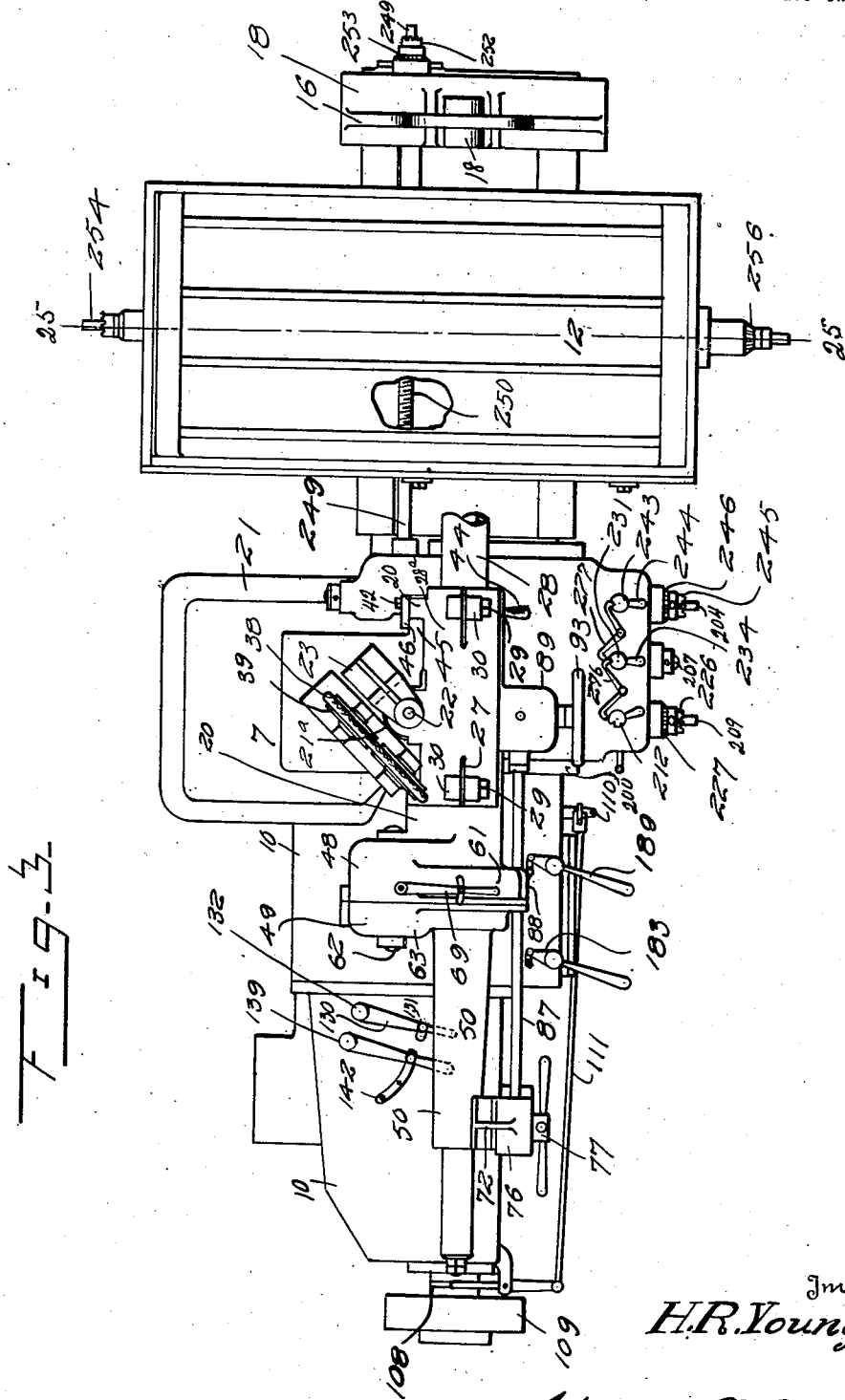

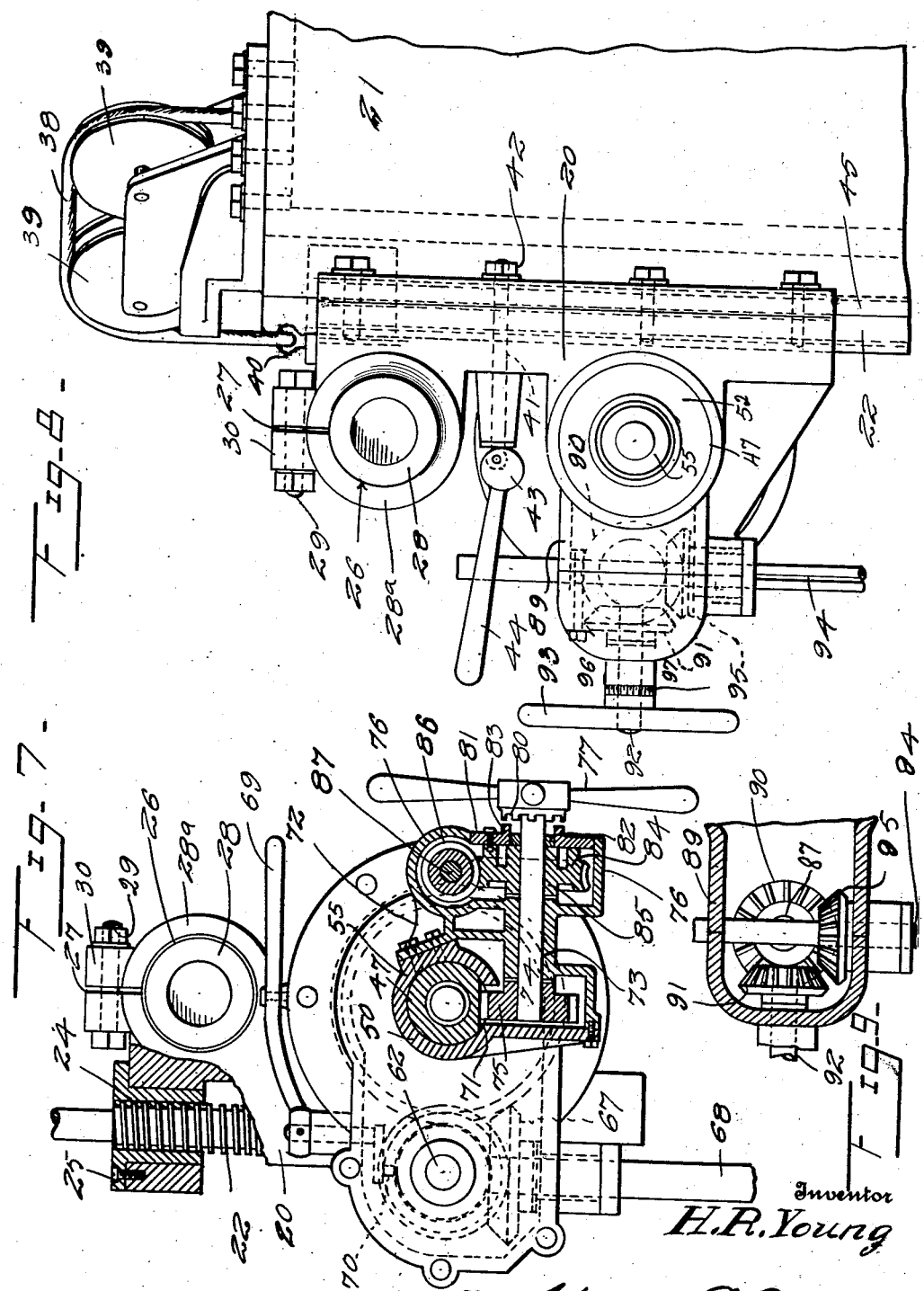

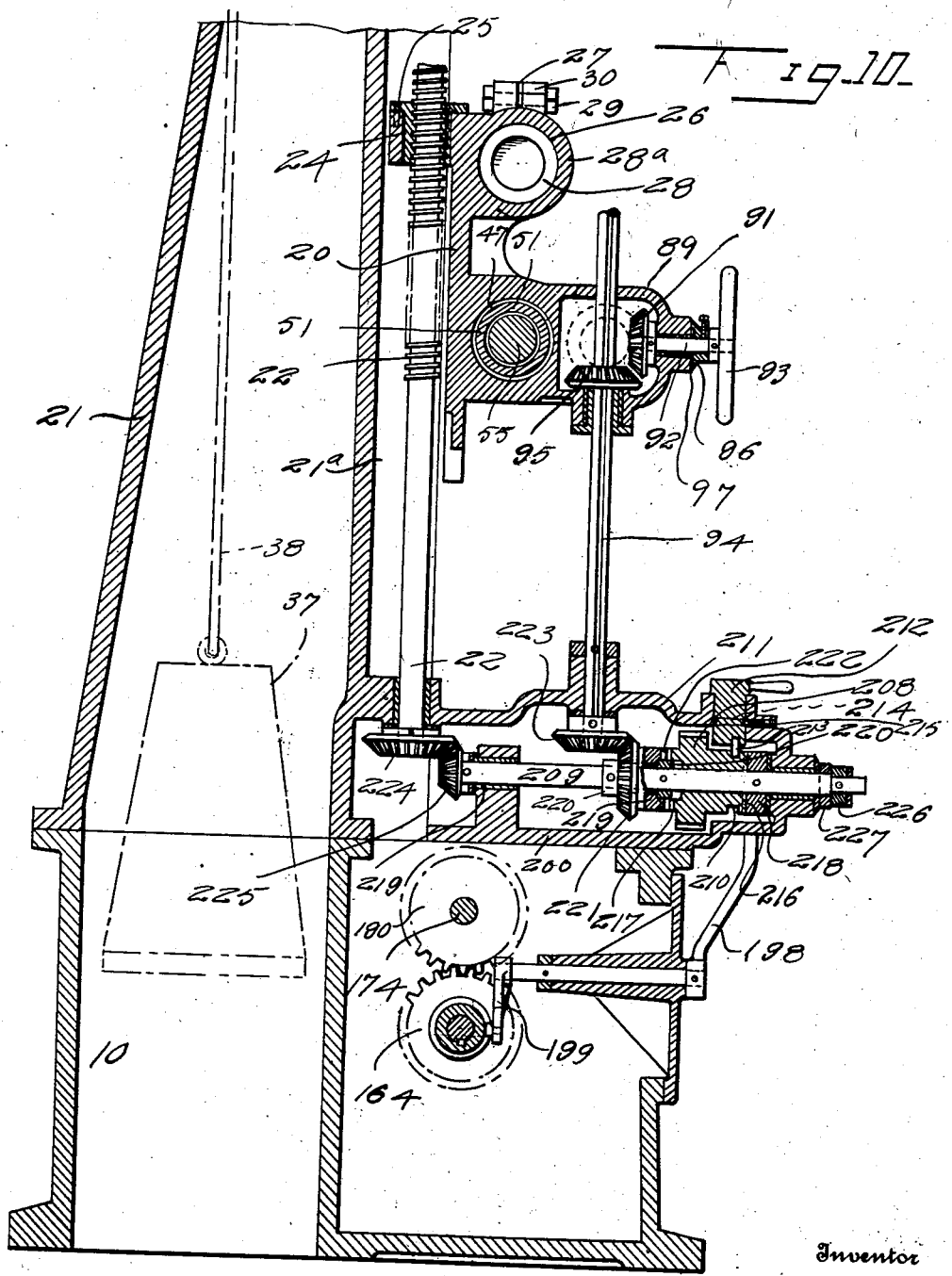

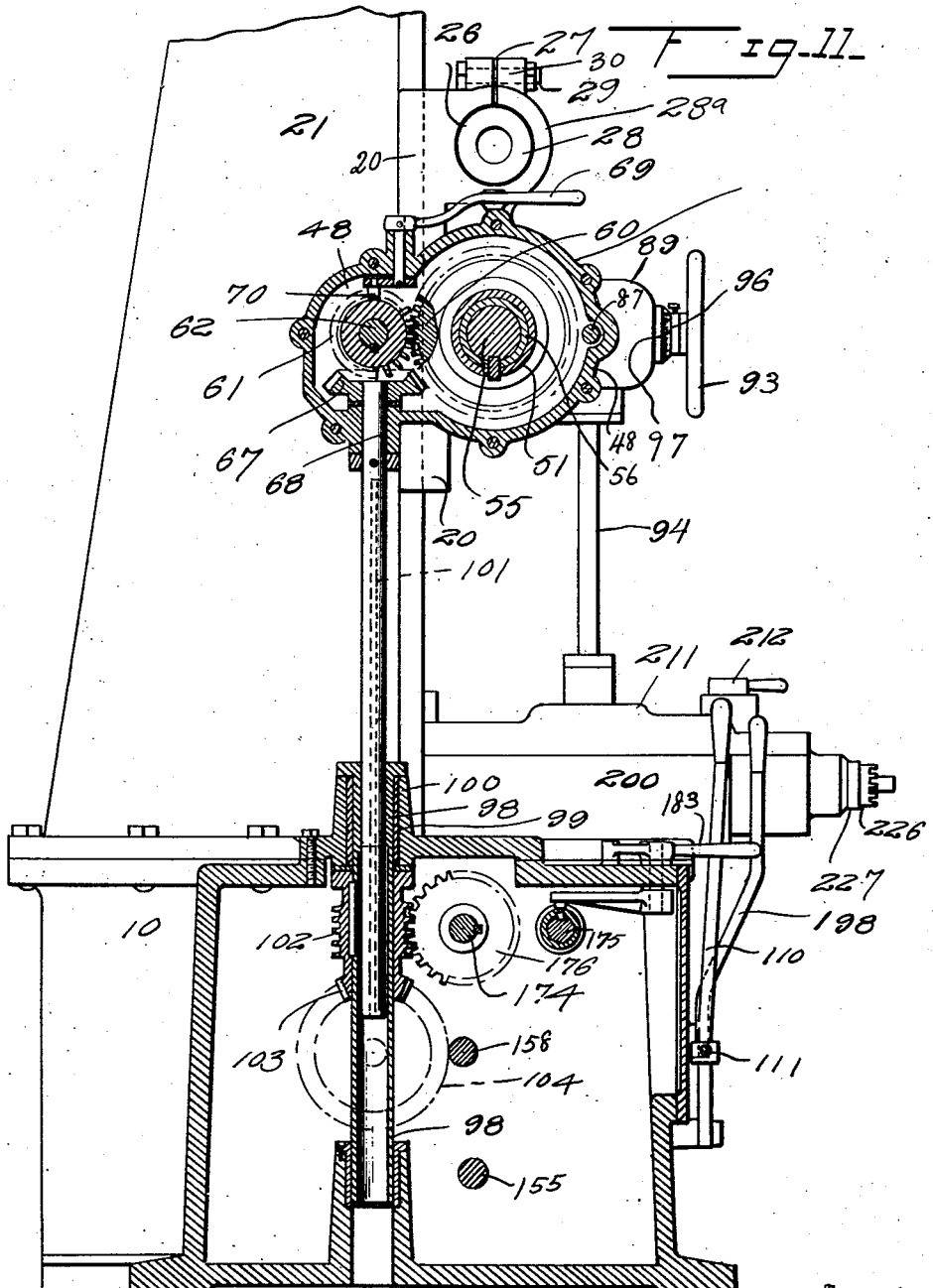

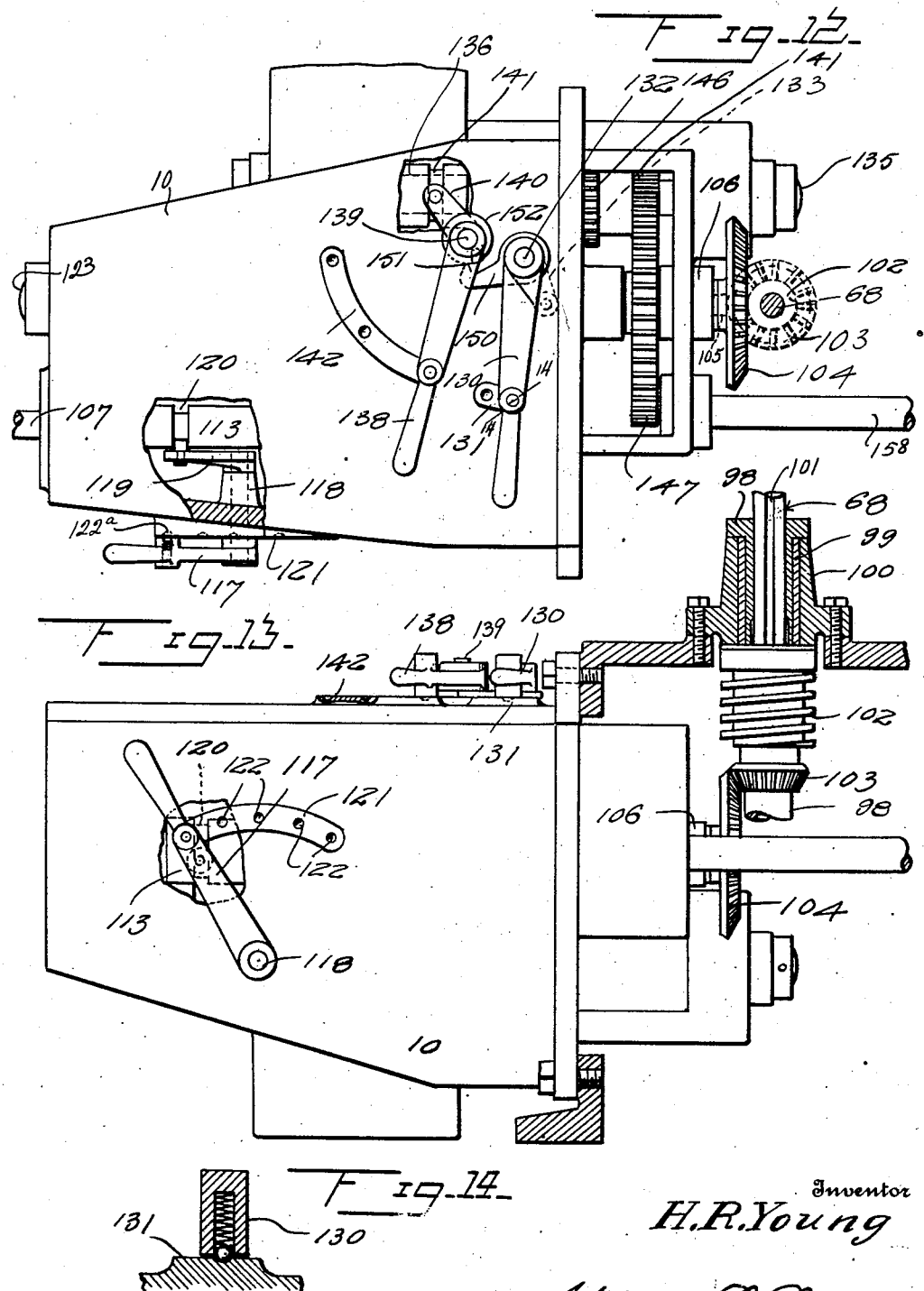

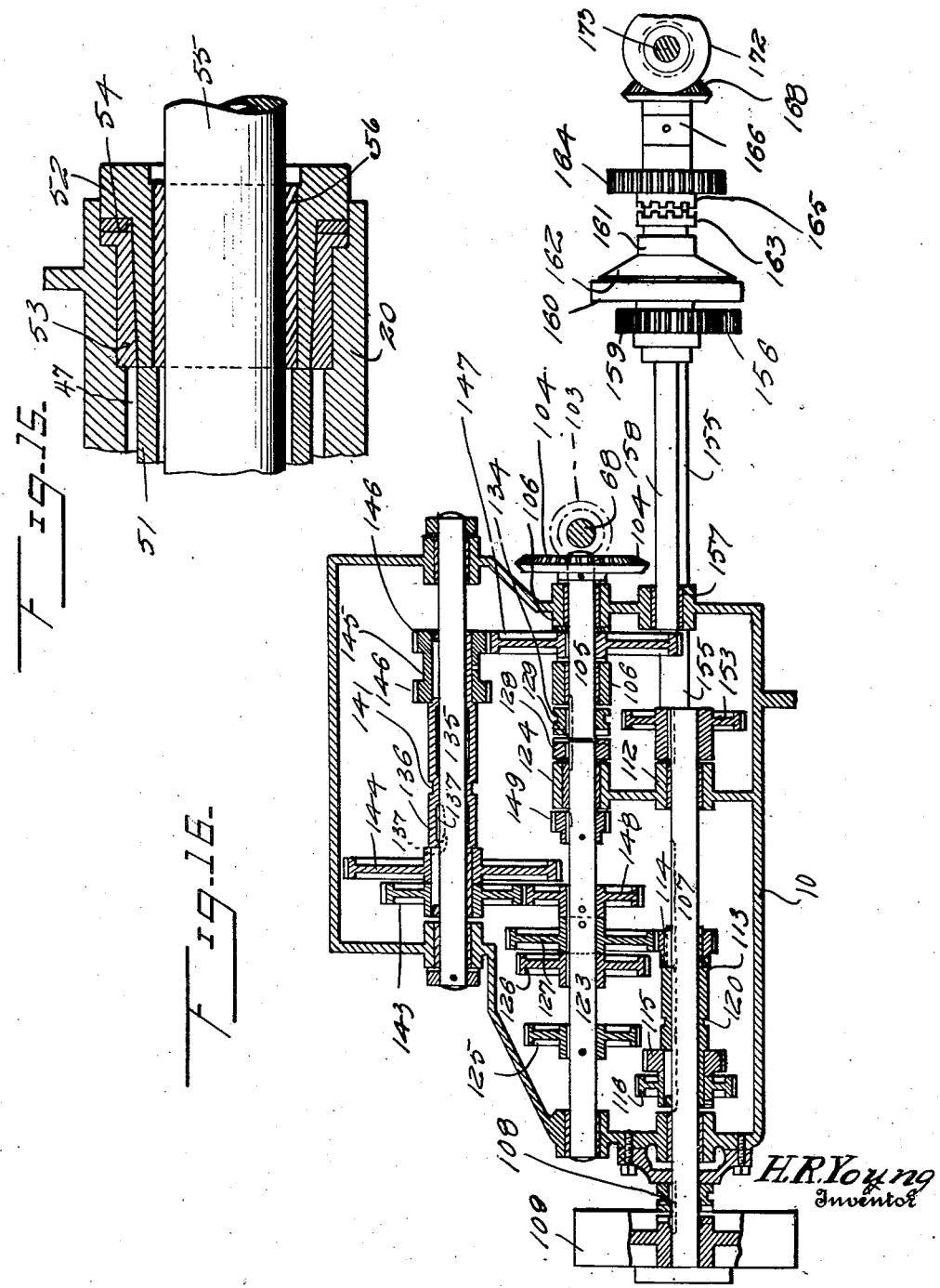

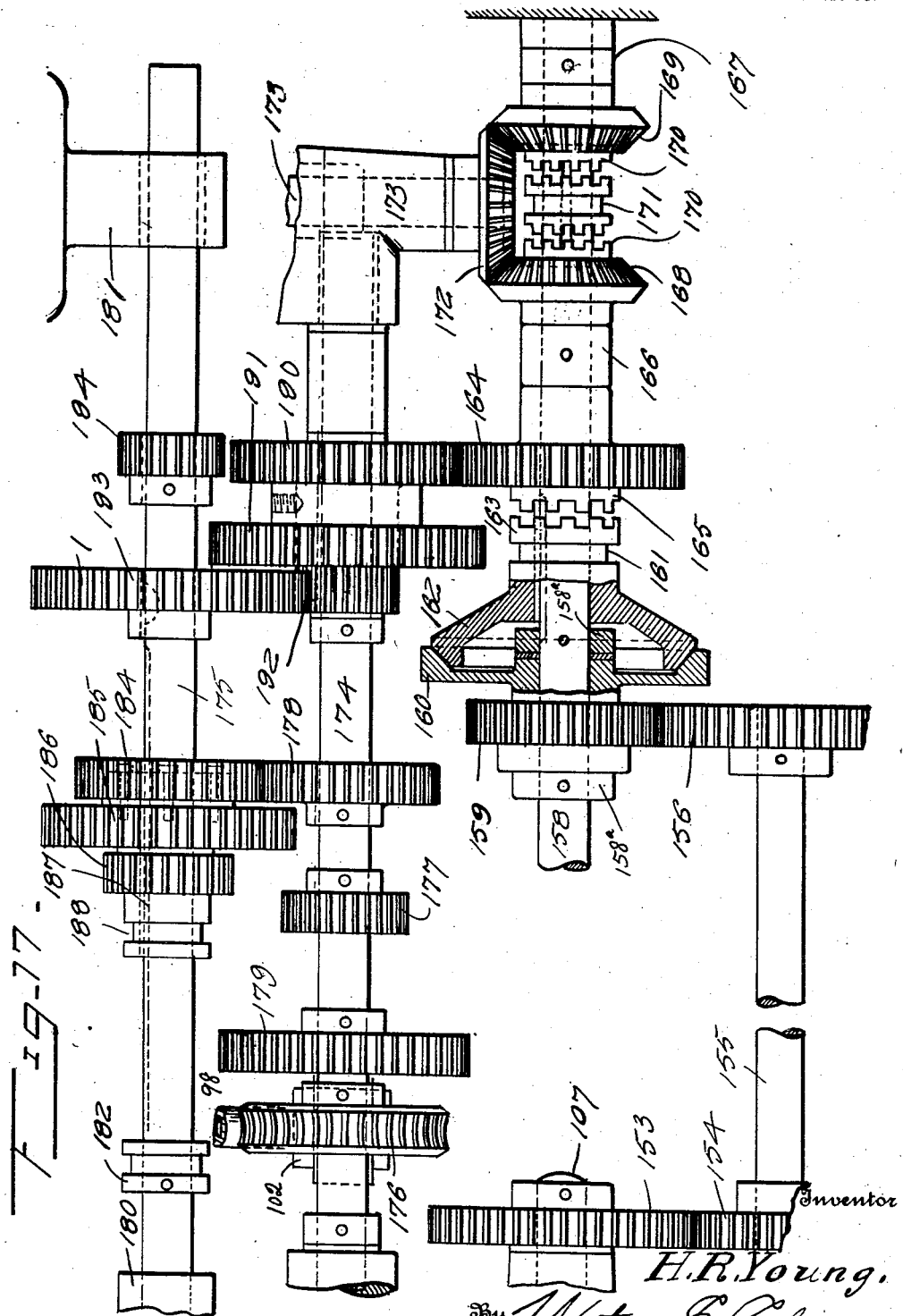

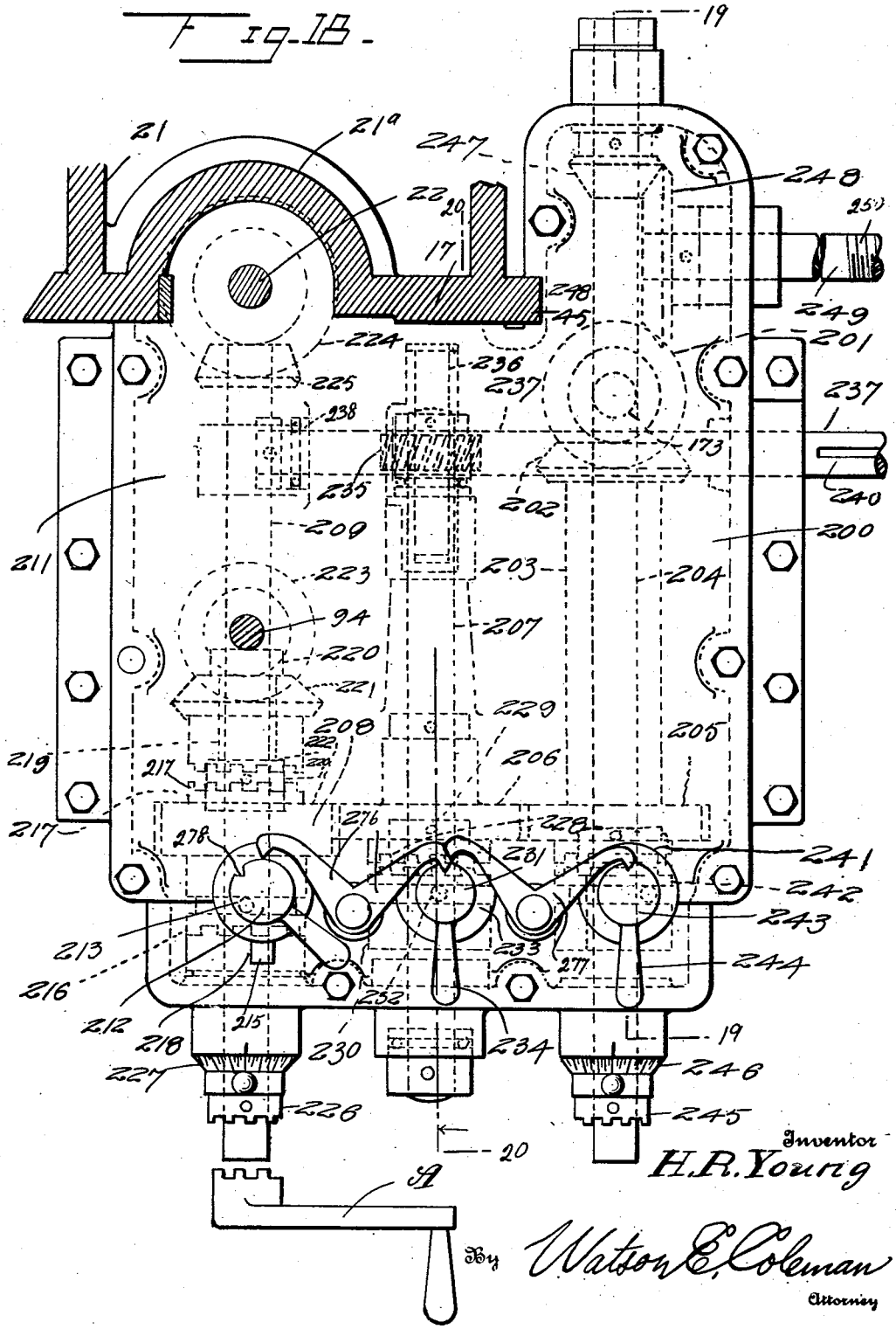

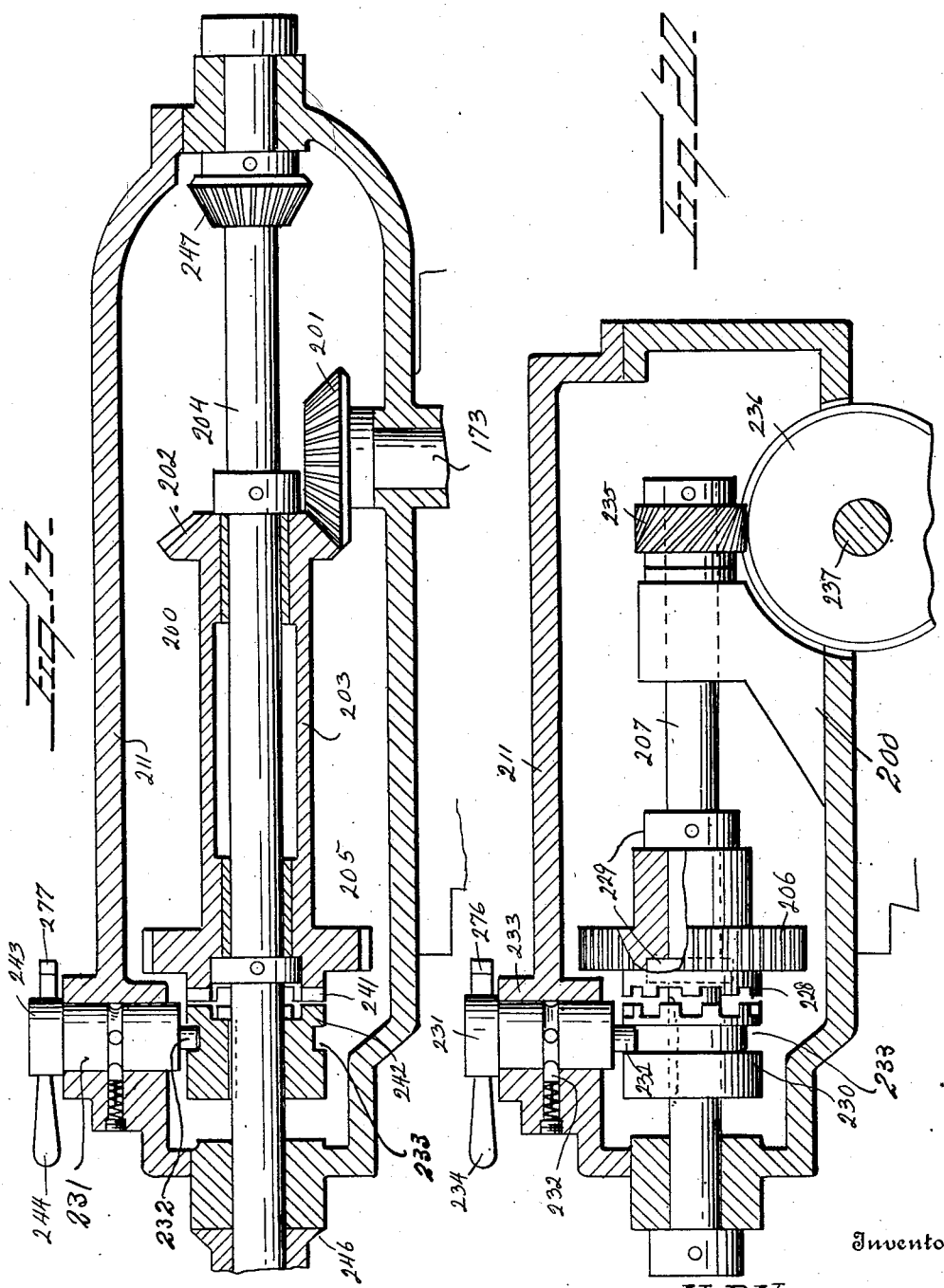

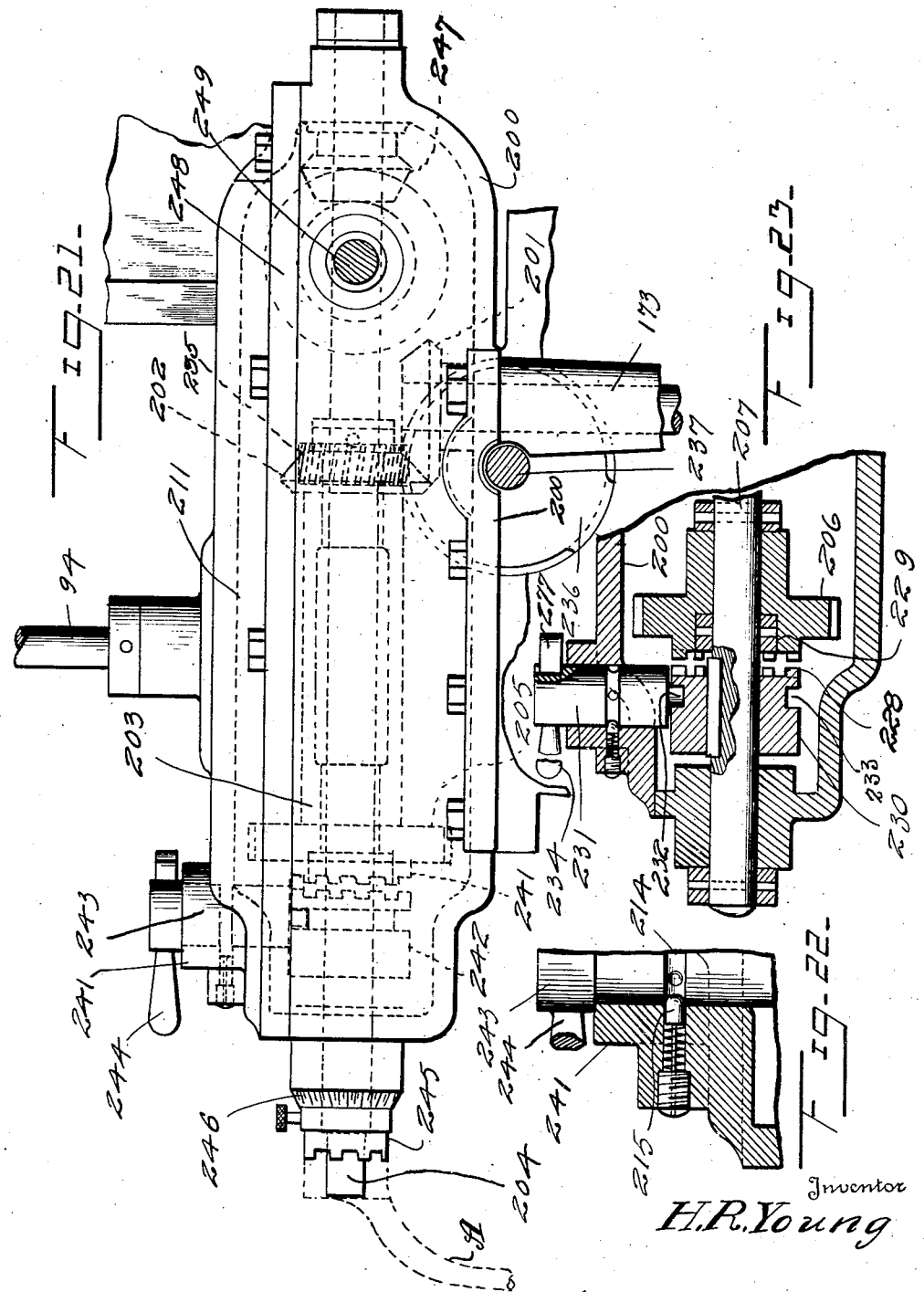

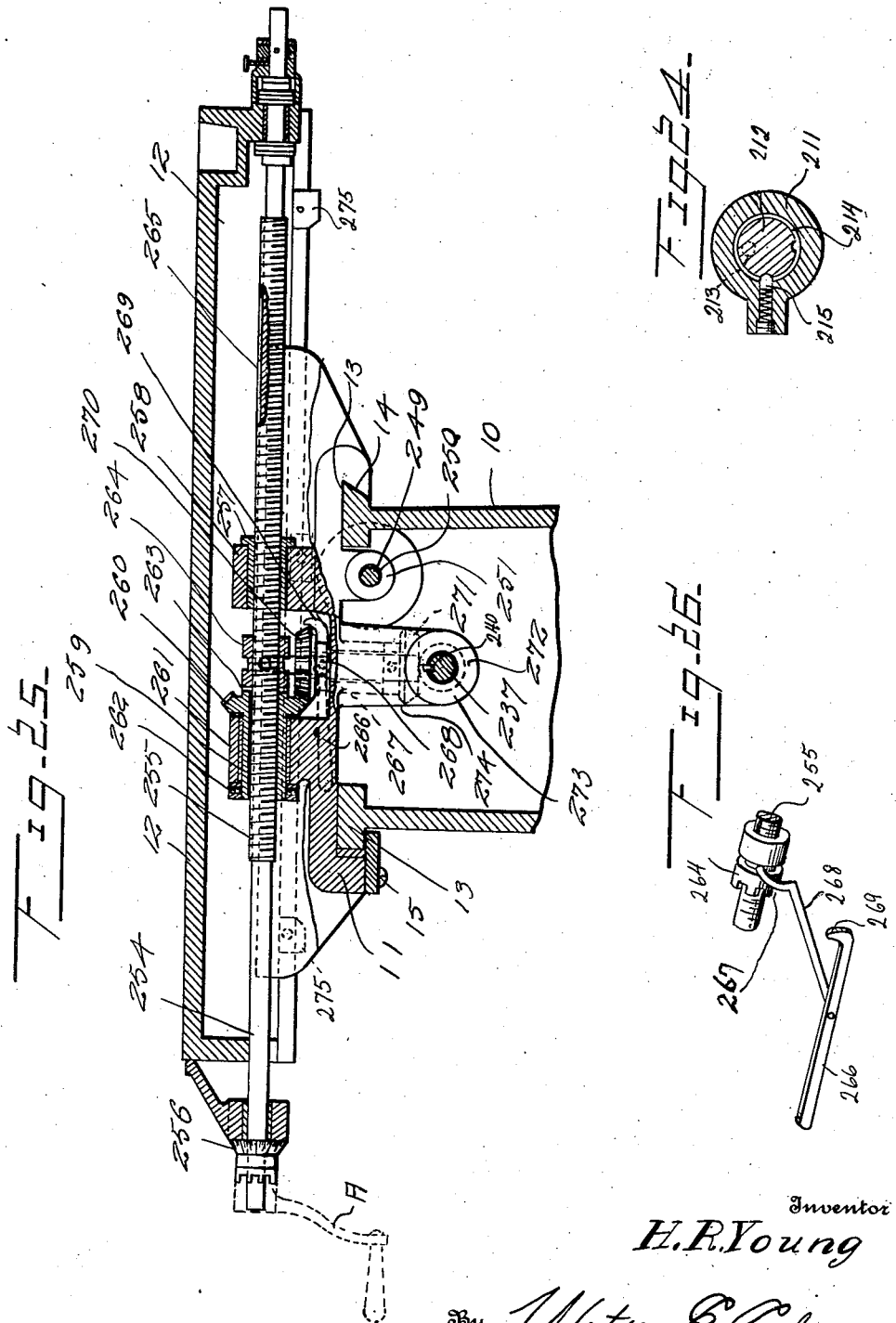

Patented Jan. 16, 1923.

1,442,210

UNITED STATES PATENT OFFICE.

HENRY RICHARD YOUNG, OF MUSKEGON, MICHIGAN.

BORING AND MILLING MACHINE.

Application filed January 24, 1920. Serial No. 353,850.

*To all whom it may concern:*

Be it known that I, HENRY RICHARD YOUNG, a citizen of the United States, residing at Muskegon, in the county of Muskegon and State of Michigan, have invented certain new and useful Improvements in Boring and Milling Machines, of which the following is a specification, reference being had to the accompanying drawings.

This invention relates to a machine for boring and milling. In machines for the purpose of boring and milling, the table or work support is usually of the knee type construction, with a shelf-like member or knee projecting outward from the column upon which it is vertically adjustable. The spindle is mounted in fixed bearings within the column, and the support arbor is also clamped therein, and in fixed relation to the spindle. The work itself is carried upon the table or platen which has longitudinal movement relative to the column, and the work, when operated on, is carried up to, or away from the tool by the table moving inward or outward on the knee. The load being of variable weight, the knee is subjected to varying stresses and strains, and in turn gives way or sags under this cantilever action set up there, with the result that the various machining processes cannot be readily maintained in alignment one to another.

The object of this invention is the construction of a machine for boring and milling, which will eliminate this objectionable sag by having a column upon which is mounted a vertically movable or adjustable spindle head, carrying a spindle and having fixed adjustably to it an arbor supporting bar with pendant or means for holding the cutter-arbor or boring-bar or other implement carried by the spindle rigid against the vibrations of work; the spindle to have an axial as well as a rotatable movement, and the table or work-support being mounted for both longitudinal and transverse movement upon the parallel ways of a rigid base, making it evident that this machine will handle any range of work capable of being performed on the knee-type milling machine in a more satisfactory manner.

The spindle and head being of constant weight, it is possible to counterbalance them quite accurately, thus making it less difficult to hold the spindle in true alignment with the work support or table.

The spindle is given further rigidity by the previously mentioned supporting arbor having at its outer end a part suitably fitted in, and adjustable along a slot in an upright member or tail-piece, mounted upon and adjustable along the before-mentioned parallel ways of the base, said part having a bearing for the shaft or mandrel of the rotatable cutter or other suitable implement.

The machine is also provided with change gearing to permit of variable speeds for both the rotation of the spindle and for the rate of traverse for the longitudinal and transverse movement of the table, the vertical movement of the spindle head and support-arbor, and for the axial movement of the spindle. The traverse of the table, spindle head or spindle, can be either power or hand operated, and in either a forward or reverse direction at a predetermined and positive rate of speed suitable for boring and milling.

This traverse can be still further controlled in this respect,—that regardless of which ever direction the table, spindle head, or spindle should be feeding, by manually shifting a lever, that feed is instantly reversed, bringing the table, spindle head or spindle (depending on whichever feed happens to be engaged for use) back at a rapid rate to the beginning of the cut, or as much farther as is desired, thereby saving much time between cuts and in setting up.

My invention is illustrated in the accompanying drawings, wherein:

Figure 1 is a side elevation of a machine constructed in accordance with my invention;

Figure 2 is an end elevation of the construction shown in Figure 1;

Figure 3 is a top plan view of the machine, the work support being partly broken away;

Figure 4 is a fragmentary side elevation of the spindle-head and spindle, the spindle-head being broken away;

Figure 5 is a fragmentary top plan view of a portion of the spindle showing a part of the gearing for driving the spindle, the housing for this gearing being broken away;

Figure 6 is a fragmentary diametrical sectional view through the shaft 74 and wheel 77 in Figure 4;

Figure 7 is a sectional view on the line 7—7 of Figure 4;

Figure 8 is a front elevation of the upper portion of the supporting column and the spindle head mounted thereon showing in dotted lines the means for feeding the spindle in its axial traverse;

Figure 9 is a fragmentary sectional view on the line 9—9 of Figure 4;

Figure 10 is a fragmentary sectional view on the line 10—10 of Figure 1;

Figure 11 is a fragmentary sectional view on the line 11—11 of Figure 1;

Figure 12 is a fragmentary top plan view of the rear end of the housing constituting the base, the housing being partly broken away;

Figure 13 is a side elevation of the parts illustrated in Figure 12;

Figure 14 is a detail sectional view on the line 14—14 of Figure 12;

Figure 15 is a fragmentary sectional view through the forward end of the spindle housing showing the forward bearings for the spindle;

Figure 16 is a horizontal section through housing 10 showing the gears for transmitting power to the various actuating shafts of the machine;

Figure 17 is a fragmentary elevation showing the system of gearing transmitting power from the shaft 155 to shaft 173, also from shaft 174 to 173;

Figure 18 is a section on the line 18—18 of Figure 1 showing the housing 200 in plan view and showing the gearing therein in dotted lines;

Figure 19 is a section on the line 19—19 of Figure 18;

Figure 20 is a section on the line 20—20 of Figure 18;

Figure 21 is an end elevation of the housing 200, the shaft 249 being shown in section and the gearing within the housing in dotted lines;

Figure 22 is a vertical sectional view through the housing of one of the clutch operating barrels to show the locking means for the barrel;

Figure 23 is a vertical fragmentary sectional view through the housing 200 on the line of shaft 207;

Figure 24 is a horizontal sectional view through the clutch shifting member 212 and its latch;

Figure 25 is a longitudinal section on the line 25—25 of Figure 3;

Figure 26 is a fragmentary detail perspective view of the clutch shifting device for the platen.

Referring to these drawings, 10 designates the hollow base of the machine, which contains the driving and speed change mechanism which will be later described. Mounted upon the base is a work support having mechanism whereby the work may be shifted or fed longitudinally of the base or transversely thereof. This work support comprises a longitudinally shiftable saddle 11 which carries the transversely shiftable platen 12 which, as illustrated in Figure 3, is much wider than the width of the saddle 11. This saddle 11 extends down over flanges 13 formed upon the side walls of the casing or housing 10, one of these flanges being undercut, as at 14, on its outside face, while the saddle is provided with a movable plate or strip 15 which engages beneath the corresponding flange 13, as illustrated clearly in Figure 25. The saddle is shifted longitudinally upon the base 10 by means which will be later described, while the platen is also shifted transversely of the base by means which will be later described.

Extending upward from one end of the base 10 and longitudinally shiftable therealong on the laterally projecting flanges 13 of the base, is a post 16 which is formed on its base to embrace and slide on the flanges 13 and which is vertically slotted, at 17, and flanged, at 18. This post or member 16 is designed to receive the arbor-support pendant, as will be later described, and the member 16 is longitudinaly adjustable upon the track flanges 13 by means of a clamp plate 19 engaging one of the flanges 13.

The spindle head, which is designated generally 20, is mounted for vertical movement on the column 21 which extends upward from the base and has vertical inner faces with which the spindle head 20 has operative engagement, as will be later stated. This column at its middle is inwardly extended, as at 21ª, to accommodate the elevating screw. The spindle head 20 is raised or lowered by an elevating screw 22 which operatively engages the head and which extends down into the base and is there connected to means for operating the screw either by power or by hand. This elevating screw 22 at its upper end is operatively engaged with the upper end of the column 21, the upper end of the screw being supported in a bearing 23 carried upon the upper end of the column and forming part thereof and being attached thereto in any suitable manner.

The spindle head carries upon it the nut 24 with which the screw 22 engages, this nut being flanged at one end and disposed in a recess in the head and held in place by a screw 25 or equivalent devices. The upper portion of the spindle head is bored, as at 26, and partially split, as at 27, to form a tubular clamp 28ª for the reception of the supporting arbor 28 and the clamp formed by boring and slitting the spindle head at the points 26 and 27 embraces this arbor support 28 and the supporting arbor is held firmly in place by means of the bolts 29 which extend through the flanges 30 on each side of the slits 27. Thus, the supporting arbor may be adjusted within the head and, then clamped in position. The supporting arbor carries at its end a boring bar or cutter bar supporting pendant, designated generally 31, which is formed to provide jaws clamping the arbor support 28 and extends downward and outward from these jaws, as at 32, and is there formed to provide a head 33. This head has a relatively flat, outer face, which contacts with the face of the post 16 and which is provided with an annular stud 34 fitting within the slot 17, and below this annular member with a screw 35 passing through the slot 17 and carrying upon it the T-shaped clamp 36, held in place by the screw against the flange 18. By this means, the supporting arbor pendant 31 may be guided in its vertical shifting movement or may be held in any vertically adjusted position. There is pressed in the head 31 a bushing 34 which forms a bearing for the boring-bar or cutting tool is supported.

The spindle head, as previously remarked, is vertically shifted by means of the screw 22 and it is counterbalanced by a counterbalancing weight 37 connected to a cable 38 passing over pulleys 39 mounted upon the upper end of the column 21. The cable 38 is connected to an eye 40 on the upper end of the spindle head 20. The head is clamped in its adjusted positions upon the column by means of a clamping rod 41 (see Figure 8) which extends through an opening in the head below the arbor support clamp, this clamp rod 41 at its inner end being provided with a nut 42 and at its outer end having an eye engaging with an eccentric or cam 43 having a lever or handle 44 whereby it may be rotated. When this cam 43 is turned into one position, the clamp is released, and when it is turned into the other position, the clamp is engaged to hold the spindle head in its vertically adjusted position. The nut 42 is engaged with any suitable part of the column, but is illustrated as engaging with the marginal flange 45 by means of the gib 46 (see Figure 3).

The head 20 on a line below the clamp rod 41 is formed with a longitudinally extending bore 47 to receive the spindle sleeve and bearings. The wall of this bore at the rear end of the spindle head is radially enlarged, as at 48 (see Figure 4), to form part of the housing for the spindle driving gears, etc., the rear portion of this housing being formed by the flared, forward end 49 of a longitudinally extending, hollow housing 50, open at its rear end.

Disposed within this bore 47 is a spindle sleeve 51 which is enlarged at its outer end, as at 52, (see Figure 15) and disposed in an enlargement of the bore 47 at the forward end of this bore is the front spindle bearing 53, preferably of bronze, and the front bearing thrust washer 54. Extending through the sleeve 51 is the spindle 55 which projects into and through the housing 50, and which is rotatably supported within the sleeve 51 by means of the bushings 56 (see Figure 4) mounted within the countersunk forward and rear ends of the sleeve 51. The spindle sleeve is supported in the bore 47 by means of the rear bearing 57 which is preferably of bronze and split, this rear bearing being adjusted by facing off the thrust washer 58 and drawing up on the spindle lock nuts 59 which are screw-threaded to fit threads on rear end of sleeve 51. The spindle 55 is keyed to the spindle sleeve 51 but the spindle has longitudinal movement with reference to the sleeve, and mounted upon the spindle sleeve 51 and disposed within the housing formed by the parts 48—49 is a spindle drive gear wheel 60 engaged by a gear wheel 61 mounted in a lateral extension of the housing 48—49 and mounted on a longitudinally extending shaft 62. This pinion 61 is loosely mounted on the shaft 62 and has a width greater than the width of the face of the gear wheel 60 and carries upon it the oppositely facing clutch teeth 63 (see Figure 5).

Mounted upon the shaft 62 are the oppositely disposed bevelled gear wheels 64 and 65 having clutch teeth 66 adapted to engage with the clutch teeth 63. These bevelled gear wheels 64 and 65 are driven by a bevelled gear wheel 67 mounted upon a vertically disposed driven shaft 68 which extends down into the base 10 and is operatively connected with driving gearing therein, as will be later stated (see Figure 11). It will be seen that by shifting the clutch pinion 61, the spindle may be driven in either direction, and for the purpose of shifting this clutch pinion, I mount upon the housing section 48 a clutch shifting lever 69, the pinion 61 being formed with a peripheral groove for engagement by a pin 70 carried by the clutch shifting lever 69.

For the purpose of feeding the spindle longitudinally, I form the rear portion of the spindle with rack teeth 71 on its under side and attach to the spindle housing 50 the laterally projecting bracket, designated generally 72, which is arranged to form a bearing 73 for a transversely extending shaft 74 carrying at its inner end the gear wheel 75 which engages said rack teeth (see Figure 7). This shaft projects out through the housing 76 forming part of the bracket 72 and carries at its outer end a quick return hand wheel 77 having radially projecting handles. This wheel 77 is keyed upon the shaft so as to slide inward and outward thereon by means of the key 78 and is held in its outwardly or inwardly shifted position by means of the spring actuated latch 79 (see Figure 6). The inner face of the hub of this wheel 77 is provided with the clutch teeth 80. The outer wall of the housing 76 is formed by a clutch disk 81 rotatably mounted upon a retaining collar 82 and having a hub formed with clutch teeth 83 adapted to engage with the clutch teeth 80 on the wheel 77. This disk 81 is fastened to and moves with a worm wheel 84 mounted to rotate the shaft 74 disposed within the bearing 73. This worm wheel is engaged by a worm 86 mounted upon a worm shaft 87 which extends parallel to the axis of the housing 50 and extends through a bearing 88 projecting laterally from the gear casing 48. This shaft 87 also extends into a housing 89, and within this housing carries upon it a gear wheel 90 (see Figure 9) having bevel teeth engaged by a gear wheel 91 mounted upon a transverse shaft 92 extending to the exterior of the housing 89 and carrying a hand wheel 93. This hand wheel and its corresponding gear 91 are intended for the purpose of feeding the spindle longitudinally by hand.

For the purpose of driving the shaft 87 by power, I provide the vertically disposed spindle feed driving shaft 94 which extends loosely through the housing 89 to the base of the machine and is connected to suitable driving mechanism, as will be later explained. This shaft 94 extends up into the housing 89, and carried by and movable with the housing 89 and slidable with relation to the shaft 94, but rotating therewith, is a bevelled gear wheel 95 which engages with the bevelled gear wheel 90 on shaft 87. Thus, the shaft 87 may be rotated by power. By this mechanism, while power is transmitted through shaft 94 to the feed shaft 87 and the mechanism coacting therewith, yet the spindle head 20 with the spindle may rise and fall according to the adjustment of the head by the screw 22. Also mounted upon this shaft 92 is a dial 96 held in place by a set screw, this dial being graduated at its margin to coact with a graduation 97 on the bearing portion of the housing 89.

It will be seen that by rotating the hand wheel 93, that motion may be transmitted to the shaft 87 to cause the forward feed of the spindle, and that likewise the spindle may be fed forward by power or may be reversely shifted either by power or hand. The hand wheel 77 provides a coarse and relatively quick means for shifting the spindle longitudinally in either direction.

The means whereby the work support is operated, whereby the elevating screw 22 is operated, whereby the speed at which the spindle is rotated may be controlled and its direction of movement reversed, and whereby the feed of the spindle may be controlled or its direction of movement reversed under power will now be described.

As illustrated in Figure 11, the spindle drive shaft 68 whereby the spindle is rotated extends vertically downward into the housing or base 10 and keyed to a sleeve 98 mounted in a bushing 99 which, in turn, is disposed within a boss 100. The shaft 68 has telescopic engagement with the sleeve 98, this shaft being provided with a keyway 101, and the sleeve 98 being provided with a key engaging this keyway. The sleeve 98 has mounted upon it and keyed thereto a worm gear 102 and bevelled gear 103. Power is transmitted to the sleeve 98 by means of the bevelled gear 103 and is transmitted from this sleeve by means of the worm 102 for a purpose which will later appear.

Meshing with the bevelled gear wheel 103 is a beveled gear wheel 104 mounted upon a short shaft 105 (see Figure 16) which, in turn, is mounted in bearings 106 formed in the casing or base 10.

All of the mechanism which has been described and which will be described is intended to be operated primarily from a main driving shaft 107 which is mounted in suitable bearings in the base 10, and which extends out at one end of this base and is operatively connected by a clutch 108 to a drive pulley 109. The clutch 108 is adapted to be operated by a lever 110 and link 111 and engaging a shipper lever 111ª which directly engages the clutch member 108. The clutch used is a standard make of friction clutch running on a flanged sleeve bolted to the gear housing or base 10. The shaft 107 is supported at its inner end in a bearing 112 and adjacent its outer end a shiftable sleeve 113 is mounted upon the shaft 107. This sleeve carries upon it three gear wheels 114, 115 and 116, these gear wheels being of different diameters. This sleeve 113 is shiftable along the shaft 107 by a controlling lever 117 (see Figures 1, 12 and 13) on the exterior of the housing 10 and attached to a shaft 118 which, at its inner end, carries an arm 119 having a pin or roller engaging in a circumferential groove 120 formed in the sleeve 113. This lever 117 moves over an index plate or guide 121 on the exterior of the housing, this guide having means for holding the lever 117 set in five different positions. Thus, the guide or plate 121 may have depressions 122 in its length set at equidistant points, and the lever carry a spring pressed pawl 122ª engaging in said depressions in an obvious manner.

Extending parallel to the shaft 107 is a shaft 123 which is mounted at one end in a bearing in the housing 10 and at its inner end is mounted in a bearing 124. This shaft 123 is in alignment with and has its inner end spaced a slight distance from the inner end of the shaft 105. The shaft 123 carries upon it three gear wheels 125, 126, and 127. The gear 114 is adapted to mesh with gear 127, the gear 115 is adapted to mesh with the gear 126, and the gear 116 with the gear 130

125. As these gears have different ratios, it is obvious that by shifting the collar 113 along the shaft 107, the shaft 123 may be driven at three different speeds with relation to the speed of the shaft 107, and, for instance, when gear 114 is engaged with gear 127, a relatively slow rotation will be communicated to shaft 123. On the other hand, when the gear 115 is engaged with the gear 126, a faster rotation will be communicated to shaft 123, and when gear 116 is engaged with gear 125, a still faster rotation will be communicated.

For the purpose of directly connecting the shaft 123 to the driving shaft 105 for the spindle, I mount upon the extremity of the speed gear shaft 123 the stationary clutch element 128, and mount upon the adjacent extremity of the shaft 105, the shiftable clutch element 129. When this clutch element is shifted into engagement with the clutch element 128, the shafts 123 and 105 will be directly connected. When the clutch element 129 is shifted away from clutch element 128, the shafts 123 and 105 will be disconnected. The shaft 105 will remain stationary unless it is indirectly driven by shaft 123.

The clutch member 129 is shifted by means of a lever handle 130 disposed on the exterior of the casing, moving over a relatively short index plate 131, this lever handle being mounted upon a shaft 132 which has an arm 133 provided with a pin engaging an annular groove 134 in the clutch element 129. The lever 130 has only two positions, one where the clutch is engaged and the other where the clutch is disengaged.

For the purpose of driving the shaft 105 indirectly from shaft 123 and thereby securing a still further variation in the speed of the shaft 105 and, therefore, the speed of the spindle driving shaft, I provide the counter-shaft 135 which is mounted in suitable bearings at its ends and which carries upon it a longitudinally shiftable sleeve 136. The shaft 135 is keyawyed for a portion of its length and a key 137 connects the sleeve to the shaft, permitting longitudinal movement of the sleeve but causing a unitary rotation of the shaft and sleeve. The sleeve is longitudinally shiftable by means of a lever 138 disposed upon the exterior of the base 10 and carried by a transverse shaft 139 having an arm 140, the arm at its extremity carrying a pin engaging in a circumferential groove 141 on the sleeve 136. This lever is movable over the index plate 142 to three positions. Carried upon the sleeve 136 and rotating therewith are two gear wheels 143 and 144 and the sleeve or collar 145 having two spaced gear wheels 146, both of the same diameter but spaced from each other a distance a little greater than the width of gear wheel 147. The gear wheels 146 may be considered to be one gear wheel to all intents and purposes. One or the other of these gear wheels 146 engages with the large gear wheel 147 mounted upon and rotating with the shaft 105. When the sleeve 136 is shifted so that neither gear wheel 146 engages the gear wheel 147, it is obvious that no power will be transmitted from the shaft 135 to the gear wheel 147. Either the gear wheel 143 can engage with gear wheel 148 mounted upon the shaft 123, or the gear wheel 144 can engage with the small gear wheel 149 mounted upon the shaft 123. It will be obvious now that the sleeve 136 may be shifted to bring either one of the gear wheels 143 or 144 into driving engagement with the shaft 123 and thus drive the shaft 105 through the shaft 135, and with one or the other of gear wheels 146 in engagement with the gear wheel 147.

With the arrangement of gears above described, nine different speeds may be secured for the shaft 105, that is for the spindle driving shaft. Assuming that the sleeve 136 has been shifted to a neutral position so that the gears 146, 143 and 144 are entirely disconnected from the gear wheels on shafts 105 and 123, and assuming that the clutch 129 has been thrown into engagement with the clutch member 128, then the shafts 123 and 105 may be driven from the shaft 107 at one of three different speeds. Assuming that the clutch member 129 is disengaged from clutch member 128, then the drive will be through the counter-shaft 135 and through one or the other of the gear wheels 146. Now anyone of the three gears 114, 115 and 116 may be used with any one of the gear wheels 143 or 144, thus making nine different speeds at which the shaft 105 may be driven, in an obvious manner. Thus the speed of rotation of the spindle is controlled by the three levers 117, 130 and 138. The lever 130 is operatively connected through the shaft 132 with an indexing pawl 150, which is adapted to engage in a notch 151 formed in a disk 152 carried by shaft 139, to which the lever 138 is attached. This indexing pawl, therefore, makes it impossible to engage the gears 143, 144 or 146 with gear wheel 147 unless the clutch member 129 has been shifted out of engagement with the clutch member 128.

In order to provide means for feeding the spindle forward or rearward under power and for rotating the elevating screw 22 under power in one direction or the other and operating the saddle and the platen by power and controlling the speeds of these several elements, I have provided the transmission mechanism illustrated in Figure 17. In this figure the shafts 155, 158, 174 and 175 are illustrated as disposed in vertical series in order to clearly show the transmission mechanism, but by reference to Figure 11 it will be seen that the shafts 155, 158 and 174 are disposed in vertical alignment but the shaft 175 is disposed laterally with respect to the shaft 174. The main drive shaft 107 is provided with a gear wheel 153 which meshes with a gear wheel 154 (see Figure 17) carried upon an intermediate shaft 155. This intermediate shaft 155 carries upon it the gear wheel 156. Disposed above the shaft 155 and mounted at one end in a bearing 157 in the base 10 and in suitable bearings disposed along the base is a quick reverse shaft 158. The gear wheel 156 meshes with a gear wheel 159 loose on the shaft 158 between collars 158ª. Formed integral with the gear wheel 159 is a female cone clutch 160 and slidably mounted upon the shaft 158 is a double clutch sleeve 161 carrying at one end the male cone clutch member 162 and the toothed clutch member 163. This sleeve 161 is splined upon the shaft 158 for longitudinal shifting movement and for rotation with the shaft. Also mounted loosely upon the shaft 158 is a gear wheel 164 having a toothed clutch 165 with which the toothed clutch member 163 is adapted to engage. It follows, therefore, that when the clutch member 162 is in engagement with the clutch member 160, the shaft 158 will be rotated from the gear wheel 156 on shaft 155 at a certain rate of speed, but when the clutch member 162 is out of engagement with the clutch member 160 and the clutch member 163 is in engagement with the clutch member 165, then the shaft 158 will be rotated by the gear 164 at comparatively slower speeds through another driving line to be later referred to. The shaft 158 passes through thrust collars 166 and 167. Loosely mounted upon the shaft 158 between the collars 166 and 167 are the facing bevelled gear wheels 168 and 169, having clutch members 170 on their confronting faces, and disposed between these clutch members 170 is a double clutch collar 171 which is shiftable from a neutral position into operative engagement with either of the bevelled gear wheels 168 or 169. Inasmuch as this clutch collar 171 is splined on the shaft 158, it follows that the rotation of the shaft will be communicated, if the clutch collar is in either one of its active positions, to one or the other of the gears 168 or 169 and that thus one of these gears will be rendered active and the other inactive. These bevelled gears 168 and 169 mesh with a horizontally disposed bevelled gear wheel 172 and this in turn is mounted upon a vertical shaft 173. This shaft 173 forms the means whereby power is transmitted to the spindle shifting and spindle elevating devices and to the saddle and platen.

The mechanism just described provides for a drive of this shaft 173 from gear wheel 153 mounted upon the main drive shaft and this secures a relatively high speed for the shaft 173. In order to secure a lower speed for this shaft 173, I provide the drive shaft 174 and the counter-shaft 175. The shaft 174 is mounted at one end in a bearing in the end of the base casting or housing and at its other end in a bearing mounted under the top of the base casting, and this shaft carries upon it a worm gear wheel 176 (see Figures 11 and 17) which is engaged by the worm 102 on sleeve 98. I have heretofore described the manner in which this sleeve 98 is driven from the main driving shaft. Therefore, it will be seen that a rotation of the worm 102 will cause a relatively slow rotation of the worm wheel 176 and a relatively slow rotation of the shaft 174 upon which the worm wheel is keyed.

The shaft 174 carries upon it three gear wheels of different diameters 177, 178 and 179. The counter-shaft 175 is longitudinally movable in bearings 180 and 181, this longitudinal movement being secured by means of a collar 182 mounted upon the shaft 175 and operated by a lever 183 mounted upon the top of the housing and movable into two positions (see Figure 3). Mounted upon the shaft 175 are a train of three connected gear wheels 184, 185 and 186 which are mounted for unitary shifting movement longitudinally upon the shaft 175, these three gear wheels being operatively mounted upon a collar 187 splined to the shaft 175, this collar being provided with a circumferential groove 188 adapted to be engaged by a hand lever 189 disposed upon the top of the casing or housing and movable to three positions. By shifting this lever and by shifting the shaft 175, the gear 184 may be engaged with the gear 178 or shaft 174, or the gear wheel 185, the gear wheel 177 or the gear wheel 186 may be engaged with the gear wheel 179. Thus, the shaft 175 may be rotated from the shaft 174 at different speeds.

In order to transmit power from counter-shaft 175 to the shaft 158, I mount loosely upon the shaft 174 the connected gear wheels 190, 191 and 192 of different diameters, and mount upon the shaft 175, to shift longitudinally therewith, the two gear wheels 193 and 194. The gear wheel 190 meshes with the gear wheel 164 loose on shaft 158 and the gear wheel 194 may be shifted into mesh with the gear wheel 191 or the gear wheel 193 may be shifted into mesh with 192. It will thus be seen that the rotation of shaft 174 is not transmitted directly to gear wheel 164 and thus to shaft 158, but that the power is transmitted with variation of speeds to wheel 164 through the intermediate gear wheels on the shaft 175 and so to the gear wheels 191 or 192 and thereby thru gear 190 to gear wheel 164 and thus to shaft 158 and to shaft 173 to rotate this shaft 173 in one or the other direction, depending upon the position of the double clutch element 171. This double clutch collar 171 is shifted by means of a lever 195 (see Figure 1) mounted upon the exterior of the housing and connected to a shaft 196 having an arm 197 engaging with the medially disposed, circumferential groove in the clutch collar. The clutch collar 161 is operated by means of a lever 198 on the exterior of the housing, in turn mounted on a shaft having an arm 199 provided at its extremity with a pin engaging in the circumferential groove of the clutch collar 161.

The shaft 173 extends upward into a gear housing 200 and carries at its upper end the bevelled gear wheel 201 (see Figure 19). This engages with a bevelled gear 202 carried by a sleeve 203 and embracing a transversely disposed, horizontal shaft 204 which extends transversely through the housing 200. This sleeve carries at its rear end the gear wheel 205 and the sleeve is loose upon the shaft 204. The gear wheel 205 meshes with a gear wheel 206 (see Figure 18) loose on a transverse shaft 207 extending parallel to the shaft 204, and the gear wheel 206 in turn meshes with a gear wheel 208 mounted upon a shaft 209 upon which this gear wheel 208 is loose. This gear wheel 208, as illustrated in Figure 10, has an outwardly extending hub having a circumferential groove 210. Mounted in cover plate 211 of casing 200 is a rotatable gear shifting member 212 having a pin 213 that engages the groove 210. This rotatable gear shifting member 212 is formed with a circumferential groove 214 and with a series of circumferential sockets, and a spring actuated plunger or latch 215 engages to lock the member 212 in either of its rotated positions and hold the member 212 from removal from the plate 211.

The outer end of this member 208 is formed with clutch teeth 216, and its inner end is formed with clutch teeth 217. Mounted upon the shaft 209 is a collar 218 having clutch teeth with which the teeth 216 engage when the gear wheel 208 is shifted outward. Having pressed into it a bushing 219 and disposed between collars 220 which are pinned on the shaft 209, is a bevelled gear wheel 221, the hub of which is formed at its rear end with clutch teeth 222 with which the clutch teeth 217 are adapted to engage. When the combined gear wheel and clutch 208 are shifted inward, the gear wheel will be engaged with this bevelled gear wheel 221 and motion is transmitted to a bevelled gear wheel 223 mounted upon the vertical shaft 94 which, by the mechanism heretofore described, feeds the spindle forward or retracts it. It will thus be seen that the power of the shaft 173 may be transmitted through the gears 205, 206 and 208 to the shaft 94, and that thus the spindle feed drive shaft 94 may be rotated by power. The mechanism whereby this spindle feed may be controlled by hand has been heretofore described.

The means for rotating the shaft 22 whereby the spindle head is raised or lowered comprises a gear wheel 224 mounted upon the screw shaft 22. This bevelled gear wheel 224 is engaged by a bevelled gear wheel 225 mounted upon the shaft 209 and rotating therewith. When the gear wheel 208 is shifted outward into engagement with the collar 218, it is obvious that the screw shaft 22 will be acted on by power from the driving mechanism heretofore described, and that the power of the driving mechanism may be either directed to the shaft 94 or to the screw shaft 22 as may be desired. The gear 208 may be also shifted to a neutral position where it will be out of engagement either with the clutch teeth 216 or the clutch teeth 222, and under these circumstances the shaft 209 may be turned by hand power applied to it by a crank A such as that shown in Figure 18 having clutch teeth engaging with a clutch member 226 pinned to the shaft 209. This shaft 209 also carries upon it the graduated dial 227 whereby the degree of movement of the shaft may be observed.

The shafts 204 and 207 are respectively connected to the saddle and to the platen and provide means whereby the saddle may be shifted longitudinally of the machine under power or by hand, and whereby the platen may be shifted transversely of the machine under power or by hand. To this end, the gear wheel 206, which is loose upon the shaft 207, is provided with clutch teeth 228 and is mounted between thrust collars 229 carried by the shaft 207 (see Figure 20). Slidably mounted upon the shaft 207 but rotating therewith is a sliding clutch 230 having clutch teeth at one end engageable with clutch teeth 228, this sliding clutch being shifted by means of a vertically disposed, rotatable clutch shifting member 231 having the same construction as the clutch shifting member 212, and carrying a pin 232 engaging a circumferential groove 233 in the clutch member and having a handle 234 whereby it may be rotated. When this clutch shifting member 231 is in one position, the clutch 230 will be shifted out of engagement with the gear wheel 206, and the shaft 207 therefore disconnected from the gear wheel, and when it is shifted in the opposite direction, the shaft 207 will be engaged with this gear wheel and rotated thereby. The shaft 207 carries upon it the spiral gear wheel 235 which engages with a spiral gear wheel 236 having a larger diameter and mounted upon the platen feed drive shaft 237 (see Figure 20), this shaft 237 at its inner end being carried in a bearing bracket 238 mounted on the top wall of the housing 200 (see Figure 18). This shaft 237 at its outer end is mounted in the upper end of the base in a bearing 239. This shaft 237 constitutes the platen drive shaft and is longitudinally splined, as at 240.

The shaft 204 passes loosely through the sleeve 203, as heretofore described, and extends out through the outside wall of the casing 200. The gear wheel 205 is provided with clutch teeth 241 and mounted upon the shaft 204 is a sliding clutch 242 operated in the manner heretofore described by a rotatable clutch shifting member 243 having a handle 244. The extremity of the shaft 204 carries a head 245 whereby the crank A may be applied thereto, and also carries the dial 246. Thus, the shaft 204 may be rotated either by power or by hand to thus adjust the saddle longitudinally on the base.

For the purpose of transmitting power from the shaft 204 to the saddle to shift the saddle longitudinally upon the tracks 13, I mount upon the inner extremity of the shaft 204 the bevelled gear wheel 247 which engages with a bevelled gear wheel 248 mounted upon a saddle drive shaft 249. This saddle drive shaft 249 is disposed to one side of the shaft 237 and somewhat above this shaft, and is screw-threaded, as at 250. The saddle 11 is provided with a downwardly extending lug 251 (see Figure 25) constituting a fixed nut with which the screw-threads 250 engage. It will thus be seen that as the shaft 249 is rotated in one or the other direction, the saddle will be shifted in one or the other direction. This saddle feed screw 249 can also be rotated by the crank handle A applied to a clutch head 252 pinned to the extremity of the shaft 249, and this head is provided with the graduated dial 253 whereby the degree of movement of the saddle may be calculated. (See Figures 1 and 3.)

The platen 12 is shifted transversely of the saddle, and therefore, transversely of the machine by means of a shaft 254 (see Figure 25) having a screw-threaded portion 255, this shaft being mounted in the downwardly turned end flanges of the platen. This shaft is provided with means at its opposite ends whereby a crank may be operatively engaged with the shaft to rotate it, which means have been heretofore described, and with a graduated dial 256 for the usual purpose. This screw engages with a nut 257 mounted in a lug or like member 258 forming part of the saddle 11. It will thus be obvious that as the shaft 254 is rotated, the platen will be caused to travel transversely of the saddle.

For the purpose of rotating this shaft 254 by power, I mount upon a sleeve 259 surrounding the screw-threads 255, the hub of a bevelled gear wheel 260. This bevelled gear wheel in turn is rotatably mounted within an upwardly extending lug 261 on the saddle 11 in a manner which will be clear from Figure 25, the gear wheel being held to the hub by means of the collar 262. The gear wheel 260 is provided in one end with clutch teeth 263, and loosely surrounding the screw-threaded shaft 254 is a clutch member 264 having clutch teeth engageable with the clutch teeth 263. This clutch member 264 engages a longitudinal groove 265 on the screw-threaded portion of the shaft 254 so that while the shaft may slide longitudinally relative to the clutch member 264, the clutch member will rotate with the shaft. When, therefore, the clutch member is shifted into engagement with the gear wheel 260, this engagement will cause a rotation of the clutch member and of the shaft 254, and when the clutch member is shifted out of engagement with the gear wheel 260, no rotation will be communicated to the shaft from the gear wheel 260. This clutch member is shifted in and out by means of a lever 266 mounted on shaft 268 having an arm 267. The lever 266 extends beyond the axis of the shaft 268 upon which it is mounted and is provided with an upwardly extending tooth 269. Meshing with the bevelled gear wheel 260 is a bevelled gear wheel 270 on a vertical shaft which carries at its lower end a bevelled gear wheel 271. Slidingly mounted upon the shaft 237 is a sleeve 272 which carries upon one end a bevelled gear wheel 273. This sleeve 272 is carried by a downward prolongation 274 of the saddle so as to move with the saddle, and this sleeve has a key engaging with the groove 240 of shaft 237. As a consequence, while the gear wheel 273 can rotate with the shaft 237, it may travel longitudinally upon the shaft. The shaft 237, therefore, transmits its power to this gear wheel 273, thence to the gear wheels 271 and 270, thence to the bevelled gear wheel 260, and through the medium of the clutch 264 to the shaft 254. Thus, it will be seen that either the saddle or the platen may be operated by power or by hand, and that the saddle and platen may be shifted simultaneously with the raising or lowering of the spindle head and simultaneously with the forward or rearward movement of the spindle.

The general operation of this mechanism will be obvious from what has gone before. It will be seen that the spindle is relatively movable both vertically and longitudinally and that the work support is relatively fixed from any vertical movement but the work support may be shifted both transversely and horizontally upon the bed, held in this adjusted position for operation upon by the tool carried in the spindle, or co-incidentally with the rotation of the spindle, the spindle may be moved or adjusted longitudinally or vertically, or co-incidentally with the rotation of the spindle the table or work-support may be moved either longitudinally or transversely upon the base; thus permitting the tool to operate in a vertical line, a longitudinal line, or a transverse line upon the work. The longitudinal movement of the spindle, the vertical movement of the spindle carrying head, the transverse and longitudinal movements of the work support may be controlled either by hand or may be selected and then made to operate by power in either a forward or reverse direction at any one of a number of speeds suitable for the particular job of boring or milling. Another feature of the control is that whichever one of these movement is being imparted to the spindle, spindle-head or work-support can be instantly reversed and at a constant and comparatively higher rate of speed by shifting the lever 198 which operates upon the clutch member 162 (see Figure 11) bringing member 162 into engagement with another clutch member 160 and out of engagement with clutch teeth in gear 164 which derives its variation of speeds from the change gear arrangement on shafts 174 and 175.

Attention is called to the fact that the platen 12 is provided with trip dogs 275, shown in Figure 25, which are adapted to engage with the tooth 269 of lever 266 so that when the platen has been shifted to either extremity of its stroke, one or the other of the dogs will engage with the lever and shift the clutch 264 out of operative engagement with the gear wheel 260, thus stopping the movement of the platen.

In Figures 3 and 18, I show interlocking dogs 276 and 277 which are pivotally mounted upon the upper face of the plate 211 and disposed between the clutch shifting members 212, 231 and 243. Each of these clutch shifting members is provided with a notch 278, and each of the dogs is provided with a pair of outwardly projecting arms adapted to engage in said notches. The adjacent ends of the arms on the dogs 276 and 277 both cannot engage in the notch 278 of the clutch shifting member 231 at the same time, and thus only one of the feed clutches of the several shafts 204, 207 and 209 can be engaged at the same time with its opposing clutch member. Thus, for instance, in Figure 18, the selecting lever of clutch shifting member 212 is set in position to engage the feed screw-shaft of the spindle head. Therefore, clutch 218, shaft 209, and bevelled pinion 225 turn as one to rotate the head elevating screw 22 through the bevelled gear 224, and shifting the handle of member 212 to the left and moving gear 208 away from clutch 218 and into engagement with the clutch teeth on gear wheel 221, then turns the driving gear to which the spindle feed drive shaft 94 is fastened. Now the lever on clutch shifting member 212 would have to be shifted into a neutral position before the arm on the dog 276 will drop into the notch 278 of member 212 and this will lift the other end of the dog out of the notch in clutch shifting member 231 and permit this clutch shifting member to be shifted. If this clutch member be shifted, it is obvious that the opposite arm of the dog 277 will be held in the notch 278 of clutch shifting member 243 so that this clutch shifting member 243 cannot be rotated, nor can the member 212 be rotated until the member 231 is brought back to a neutral position, and it will also be obvious that unless the member 243 is brought back to a neutral position, neither the clutch shifting member 231 nor 212 can be shifted.

A milling and boring machine of the character described is adapted for a large variety of work because of the fact that there is a constant weight to be raised, lowered and shifted, namely the weight of the spindle head in contradistinction to shiftng the weight of the work which, of course, varies with each piece of work.

By providing a supporting arbor mounted on the vertically movable spindle head, I am able to do any kind of work which is capable of being done on a milling machine of the knee type, that is a milling machine in which the work is supported by a vertically movable and adjustable knee. By shifting the pendant 32 out of the way or removing the supporting arbor 28, my machine is capable of doing any kind of work which is capable of being performed upon that type of machne in which the spindle carrying head is vertically movable and the work is fixed. By the combinaton disclosed, therefore, I very largely increase the range of work adapted to be performed on a machine of this character.

While I have illustrated a construction which I have found to be thoroughly effective in actual practice, yet it is obvious that many changes might be made therein without departing from the spirit of the invention.

I claim:—

1. In a machine of the character described, a base, a work support mounted thereon, a column thereon, a vertically slotted supporting member adjustably mounted upon the base and extending parallel to the column, a head vertically movable on the column, means for vertically shifting the head, a spindle mounted upon the head for rotational and longitudinal movement relative to the head and vertical movement therewith, power operated means for rotating the spindle, means for longitudinally shifting the spindle, a supporting arbor mounted upon the head for longitudinal and rotative adjustment, and a member mounted upon the extremity of the arbor for adjustment thereon depending below the arbor and at its extremity slidably adjustable in the slot of said vertical supporting member, said member having a bearing for the shaft of a cutting tool disposed in said spindle.

2. A machine of the character discribed comprising a base, an upstanding, vertically slotted member at one end of the base, a column extending upward from the base, a head vertically slidable on said column, a supporting arbor mounted upon and adjustable longitudinally with relation to the head, a cutting tool supporting member carried upon the extremity of the arbor and slidingly engaging the slot of said upstanding member, a tool spindle mounted upon the head for rotation and for longitudinal movement relative thereto and disposed opposite the cutting tool supporting member, power operated means for rotating the spindle, and means for longitudinally shifting the spindle.

3. A mechanism of the character described comprising a base, a column extending upward from the base, a vertically slotted post extending upward from the base and longitudinally adjustable therealong, a supporting arbor supported in the head and movable therewith, a clamp on the head through which the arbor is adjustable, said arbor extending toward the post, and a dependent member carried upon the arbor and slidingly engaging the slot in said post and having a bearing for a cutting tool, means for clamping said dependent member in adjusted position on said post, a tool spindle mounted in the head for longitudinal movement independent thereof and for rotation, said spindle being disposed immediately and in line with the bearing in the dependent member power operated means for rotating the spindle, and means for longitudinally shifting the spindle.

4. A mechanism of the character described comprising a base, a column extending upward from the base, a vertically slotted member extending upward from the base and longitudinally adjustable therealong, a tool spindle mounted on the head for longitudinal movement independent thereof and for rotation, power operated means for rotating the spindle, means for longitudinally shifting the spindle, a supporting arbor mounted within the head for longitudinal adjustment and vertically movable with the head, said arbor extending parallel to said spindle and toward the slotted post, and a dependent member clamped upon the supporting arbor, said dependent member at its lower end being off-set toward the post and formed to slidingly engage the post and having a bearing for a cutting tool, said bearing being disposed in alignment with the axis of the spindle.

5. A mechanism of the character described comprising a base, a column extending upward from the base, a vertically slotted member extending upward from the base and longitudinally adjustable therealong, a head mounted on the column for vertical movement, a tool spindle mounted on the head for longitudinal movement independent thereof and for rotation, power operated means for rotating the spindle, means for longitudinally shifting the spindle through the head, a supporting arbor mounted upon the head for longitudinal adjustment and for vertical movement with the head, said arbor extending parallel to the spindle and toward the slotted post, and a dependent member having a clamp at its upper end embracing the extremity of the arbor, said dependent member being inclined downward and toward the slotted post and at its lower end having a portion extending through the slot of the post and adapted to be clamped to the post, said dependent member at its lower end having a bearing for a cutting tool and disposed in alignment with the axis of the spindle.

6. In a boring and milling machine, a base, a vertically extending column mounted upon the base, a spindle carrying head vertically adjustable upon said column, a longitudinally disposed, longitudinally movable tool carrying spindle mounted in the head, a work support mounted upon the base for horizontal movement but having no movement in a vertical plane, a supporting bar mounted upon the head parallel to the spindle and movable with the head and longitudinally adjustable relative to the head, and a supporting member fixed to the base beyond the work support and extending vertically upward, the extremity of the supporting bar having operative sliding engagement in a vertical plane with said member.

In testimony whereof I hereunto affix my signature.

HENRY RICHARD YOUNG.